United States Patent [19]

Goltz et al.

[11] Patent Number: 5,288,307

[45] Date of Patent: Feb. 22, 1994

[54] METHOD TO REDUCE FUEL VAPOR EMISSIONS

[75] Inventors: H. Robert Goltz; Tom N. Demopolis, both of Midland, Mich.

[73] Assignee: The Dow Chemical Company, Midland, Mich.

[21] Appl. No.: 937,799

[22] Filed: Aug. 28, 1992

[51] Int. Cl.$^5$ .............................................. B01D 53/04
[52] U.S. Cl. ...................................... 95/143; 95/146; 95/900
[58] Field of Search ............................ 55/68, 74, 387

[56] References Cited

U.S. PATENT DOCUMENTS

| | | |
|---|---|---|
| 2,642,417 | 6/1953 | Wheaton et al. |
| 2,992,544 | 7/1961 | McMaster . |
| 3,093,124 | 12/1960 | Wentworth ......................... 123/136 |
| 3,191,587 | 6/1965 | Hall ...................................... 123/136 |
| 3,352,294 | 7/1965 | Biller et al. ......................... 123/136 |
| 3,393,669 | 5/1966 | Vardi et al. ......................... 123/136 |
| 3,549,562 | 12/1970 | Mindick et al. . |
| 3,586,646 | 6/1971 | Corte et al. . |
| 3,686,827 | 8/1972 | Haigh et al. ........................... 55/74 |
| 3,798,826 | 3/1974 | Ferguson ......................... 43/54.5 R |
| 3,798,876 | 3/1974 | Kennedy ................................. 55/59 |
| 3,805,493 | 4/1974 | Kennedy et al. ....................... 55/74 |
| 3,844,739 | 10/1974 | Alfrey, Jr. .............................. 55/74 |
| 4,063,912 | 12/1977 | Neely et al. ............................ 55/74 |
| 4,157,376 | 6/1979 | Vulikh et al. ....................... 55/74 X |
| 4,192,921 | 3/1980 | Dales ..................................... 521/38 |
| 4,218,224 | 8/1980 | Sun ......................................... 55/20 |
| 4,224,415 | 9/1980 | Meitzner et al. .................... 521/38 |
| 4,246,386 | 1/1981 | Howell et al. ..................... 526/207 |
| 4,256,840 | 3/1981 | Meitzner et al. .................... 521/33 |
| 4,265,768 | 5/1981 | Beasley et al. ................... 55/74 X |
| 4,283,499 | 8/1981 | Howell .................................. 521/38 |
| 4,444,961 | 4/1984 | Timm .................................... 526/88 |
| 4,519,816 | 5/1985 | Clarke ................................... 55/59 |
| 4,675,309 | 6/1987 | Hirai et al. ........................ 55/74 X |
| 4,863,494 | 9/1989 | Hayes .................................... 55/59 |
| 4,902,311 | 2/1990 | Dingfors et al. ..................... 55/60 |
| 4,906,263 | 3/1990 | von Blücher et al. ............. 55/316 |
| 4,957,897 | 9/1990 | Maroldo et al. ................ 55/74 X |
| 5,021,071 | 6/1991 | Reddy .................................... 55/58 |
| 5,037,857 | 8/1991 | Maroldo et al. .................... 521/29 |
| 5,079,274 | 1/1992 | Schneider et al. ................. 521/146 |

FOREIGN PATENT DOCUMENTS

| | | |
|---|---|---|
| 979823 | 12/1975 | Canada ..................................... 55/74 |
| 0388140A1 | 11/1991 | European Pat. Off. . |
| 0455143A1 | 11/1991 | European Pat. Off. . |
| 203556 | 10/1983 | Fed. Rep. of Germany . |
| 220964A1 | 4/1985 | Fed. Rep. of Germany . |
| 220965A1 | 4/1985 | Fed. Rep. of Germany . |
| 229992A1 | 11/1985 | Fed. Rep. of Germany . |
| 249703A1 | 9/1986 | Fed. Rep. of Germany . |
| 249190A1 | 9/1987 | Fed. Rep. of Germany . |
| 249193A1 | 9/1987 | Fed. Rep. of Germany . |
| 249194A1 | 9/1987 | Fed. Rep. of Germany . |
| 249274A1 | 9/1987 | Fed. Rep. of Germany . |
| 4001831A | 7/1991 | Fed. Rep. of Germany . |
| 1-067222A | 3/1989 | Japan . |
| 1-227861A | 9/1989 | Japan . |
| 2091581 | 8/1982 | United Kingdom ................... 55/74 |

OTHER PUBLICATIONS

Schildknecht, "Polymerization in Suspension" Interscience Publishers, Inc., New York, Chapter 111, pp. 69–109.

Ullmann's Encyclopedia of Industrial Chemistry, 5th Ed., vol. A-11 (VCH Publishers, New York, N.Y., 1988) pp. 436–439.

*Primary Examiner*—Robert Spitzer

[57] ABSTRACT

Hydrocarbon emissions from fuel reservoirs, particularly those associated with motor vehicles, are abated by contacting a vented hydrocarbon fuel vapor stream from the reservoirs with a polymeric adsorbent derived from a macroporous or macroreticular copolymer of at least one monovinylidene aromatic monomer and a crosslinking monomer. The macroporous copolymers are converted into suitable adsorbents by post-polymerization crosslinking in a swollen state in the presence of a Friedel-Crafts catalyst. The resulting adsorbent has improved hydrocarbon adsorption capacity relative to conventional activated carbon adsorbents.

30 Claims, 3 Drawing Sheets

METHOD TO REDUCE FUEL VAPOR EMISSIONS

BACKGROUND OF THE INVENTION

The present invention concerns a method for reducing hydrocarbon emissions by use of adsorbent materials. In particular, the invention concerns the use of polymeric absorbents for reducing hydrocarbon emissions from fuel reservoirs.

The United States and other countries have enacted regulations requiring motor vehicle manufacturers to develop systems limiting emissions of hydrocarbon fuels to certain prescribed levels. Fuel storage tanks employed in motor vehicles inevitably develop elevated tank pressures due to vaporization of the fuel into a void space created between the surface of the fuel and top of the tank. The vapor formed is actually a mixture of air and hydrocarbon fuel vapors. Vaporization of the fuel occurs primarily due to heating of the fuel, such as when a motor vehicle is subjected to atmospheric temperature fluctuations during the course of a day. As a result of such pressure buildups, storage tanks are vented for safety purposes.

To reduce hydrocarbon emissions into the atmosphere, vehicles have been designed with systems that vent such storage tanks through a canister containing activated charcoal. The hydrocarbons contained in the air/fuel vapor mixture are then adsorbed to some extent onto the activated charcoal and, thus, are not expelled into the atmosphere. When the engine of the motor vehicle is subsequently operated vacuum pressure from the vehicle's engine manifold is used to draw air through the activated charcoal to desorb the hydrocarbons retained thereon. The desorbed hydrocarbons are then directed to the vehicle's engine where they are subsequently mixed with air and combusted. Examples of such systems are seen in U.S. Pat. Nos. 3,093,124; 391919587; 3,352,294; and 3,393,669. U.S. Pat. No. 4,906,263 discloses use of a polyurethane foam support matrix impregnated with granules of adsorbent materials, such as activated charcoal, to remove pollutants and gases from fluid streams.

Due to enactment of more stringent environmental regulations requiring even greater reductions in fuel vapor emissions, the use of activated carbon in the above-described systems is becoming less desirable due to its low capacity for adsorbing fuel vapors. To meet the new regulatory standards, it may be necessary to employ larger amounts of activated charcoal in such canisters, in some cases as much as four times the amount presently employed. As the space available within motor vehicles for such canisters is limited, simply using more activated charcoal and a larger canister is not feasible. The use of larger amounts of adsorbent would increase vehicle weight, which undesirably reduces fuel economy. Any design changes associated with the use of a larger canister may also require expensive re-tooling of equipment used in the manufacturing process.

Certain types of polymeric adsorbents have been previously proposed for fuel vapor recovery systems, but the capacity of such adsorbents has been, at best, only comparable to that of activated carbon. For example, U.S. Pat. No. 3,844,739 discloses use of a dual-bed sorbent system wherein one bed is a styrene-divinylbenzene copolymer having from 17 to 75 weight percent divinylbenzene and the second bed is of activated carbon. U.S. Pat. Nos. 3,798,826 and 3,805,493 disclose use of adsorbents based on acrylic and nonpolar aromatic polymers. U.S. Pat. No. 4,863,494 discloses the use of porous divinylbenzene polymers.

In addition to emissions of fuel vapors from motor vehicles, the above-described problem is similarly applicable to fuel storage tanks or reservoirs used to hold or transport fuels. Such reservoirs are typically vented, which also presents the possibility for release of fuel vapors. It would be desirable to employ an improved adsorbent for reducing emissions of fuel vapors from these reservoirs as well.

As can be seen, what is needed is a method to reduce fuel vapors that employs an adsorbent material having a relatively high capacity for retaining hydrocarbons. Such an adsorbent would be a suitable replacement material for activated carbon in a wide variety of systems designed to reduce fuel vapor emissions, and in particular, fuel vapor emissions associated with motor vehicles.

SUMMARY OF THE INVENTION

The above described objects and advantages are attained by the present method for reducing hydrocarbon fuel vapor emissions from fuel reservoirs. The method comprises contacting a hydrocarbon fuel vapor stream from a fuel reservoir with a polymeric adsorbent to retain at least a portion of the hydrocarbon fuel vapors emitted therefrom. The polymeric adsorbent comprises a porous copolymer of at least one monovinylidene aromatic monomer and a crosslinking monomer which has been post-crosslinked in a swollen state in the presence of a Frieder-Crafts catalyst.

In a preferred embodiment, the adsorbent comprises a novel, porous copolymer of at least one monovinylidene aromatic monomer and a crosslinking monomer which is post-crosslinked in a swollen state in the presence of a Frieder-Crafts catalyst. This porous copolymer has a cellular polymeric structure wherein a macroporous void phase is dispersed within a continuous copolymer phase. The porous void phase comprises a plurality of cellular void spaces which are at least partially enclosed by walls of the continuous copolymer phase.

BRIEF DESCRIPTION OF THE DRAWINGS

FIG. 3 is discussed in connection with Examples 1-12 and Comparative Example A.

DETAILED DESCRIPTION OF THE INVENTION

Figure 1:
FIG. 1 is a scanning electron photomicrograph (SEM) of a porous copolymer described hereinafter which has a cellular-type polymeric structure.

In this invention, adsorbent materials are employed which are obtained by post-crosslinking a porous copolymer in a swollen state in the presence of a Friedel-Crafts catalyst. For purposes of this invention, a porous copolymer is broadly defined to include copolymers prepared by polymerization of monomers in the presence of an amount of an inert diluent sufficient to cause phase separation of the resulting copolymer from unreacted monomer and diluent.

The terms "macroporous" and "macroreticular" are well known in the art and, in general, refer to porous polymers having regions of densely packed polymer chains exhibiting molecular-sized porosity which are separated by copolymer-free void space, typically referred to as "macropores" within the art. The macropores generally have diameters of about 100 Å or greater. In contrast, gel-type, or microporous, copolymers have pores of essentially only about molecular-size (generally less than about 50 Å). Gel and macroreticular copolymers are further discussed in U.S. Pat. No. 4,224,415, the relevant teachings of which are incorporated herein by reference. The porous copolymers employed as adsorbent materials herein include both macroporous or macroreticular copolymers. Also suitable are novel porous copolymers with a novel cellular polymeric structure, as described hereinafter and in a copending application filed concurrently herewith.

In general, porous copolymers may be prepared by forming a suspension of a monomer mixture within an agitated, continuous suspending medium. The monomer mixture comprises at least one monovinylidene aromatic monomer, a cross-linking monomer, an effective amount of a phase-separating diluent, and an effective amount of a free-radical polymerization initiator. The suspending medium may contain one or more suspending agents commonly employed in the art. Polymerization is initiated by heating the suspension to a temperature of typically from about 50° C. to about 90° C. The suspension is maintained at the polymerization temperature until reaching a desired degree of conversion of monomer to copolymer. Another suitable polymerization method is described in U.S. Pat. No. 4,444,961.

The monomers employed are addition polymerizable ethylenically unsaturated compounds. Such monomers are well known and reference is made to Polymer Processes, edited by Calvin E. Schildknecht, published in 1956 by Interscience Publishers, Inc., New York, Chapter III "Polymerization in Suspension" at pp. 69–109 for purposes of illustration.

In Table II on pp. 78–81 of Schildknecht are listed diverse kinds of monomers suitable in practicing this invention. Of such ethylenically unsaturated monomers, of particular interest are water-insoluble monovinylidene aromatic monomers such as styrene, vinyl naphthalene, alkyl-substituted styrenes (particularly monoalkyl-substituted styrenes such as vinyltoluene, ethylvinylbenzene and t-butylstyrene) and halo-substituted styrenes, such as bromo- or chlorostyrene and vinylbenzylchloride; and mixtures of one or more of said monomers. Preferred monovinylidene aromatic monomers include styrene, monoalkyl-substituted styrenes, and halo-substituted styrenes. Also suitable are diverse polyvinylidene compounds which may be employed as crosslinking monomers, such as polyvinylidene aromatics like divinylbenzene, divinyltoluene, divinylxylene, divinylnaphthalene, trivinylbenzene, divinyldiphenyl ether, divinyldiphenyisulfone, as well as diverse alkylene diacrylates and alkylene dimethacrylates. Preferred crosslinking monomers are divinylbenzene, trivinylbenzene, and ethylene glycol dimethacrylate.

It is possible to employ relatively minor amounts of non-aromatic monovinylidene monomers, such as acrylic monomers like methyl acrylate, methyl methacrylate and methyl ethyl acrylate, within the monomer mixture being polymerized. Where such nonaromatic monomers are employed, the amount of the nonaromatic monomers is desirably less than about 30 weight percent based on total monomer weight. However, the use of non-aromatic monomers is less preferred (relative to use of monovinylidene aromatic monomers), as the resulting adsorbent materials will generally have lower capacity for adsorption of fuel vapors.

The proportion of cross-linking monomer within the monomer mixture should be sufficient to render the resulting copolymer insoluble during subsequent postcrosslinking steps, as described hereinafter. Generally, a suitable amount of crosslinking monomer is minor, i.e., from about 0.3 to about 10 weight percent, and preferably from about 0.75 to about 5 weight percent based on total monomer weight, with the balance being the monovinylidene aromatic monomer.

Phase-separating diluents useful in conducting the invention are those which are a solvent for the monomers employed, but are non-solvents for the resulting copolymer. As such, phase separation between the resulting copolymer and the monomer phase occurs as the copolymer forms. Suitable phase-separating diluents are organic solvents which are substantially inert with respect to the suspending medium, monomers, and resulting copolymer. Generally, organic solvents having boiling points of at least about 60° C. are suitable and include aromatic hydrocarbons, aliphatic hydrocarbons, halogenated hydrocarbons, and aliphatic alcohols. Examples of suitable diluents are hexane, heptane, isooctane, benzene, toluene, xylene, tert-amyl alcohol, nbutanol, sec-butanol, 2-ethylhexanol, and decanol. The choice of diluent will depend on the particular monomers being polymerized. The amount of diluent used to make a macroporous or macroreticular copolymer can vary widely depending on the type and proportion of monomers employed, but generally an adequate amount will be from about 20 to about 90 weight percent based on total weight of the monomer mixture, with from about 30 to about 50 weight percent being preferred.

The free-radical initiator may be any one or a combination of conventional initiators for generating free radicals in the polymerization of ethylenically unsaturated monomers. Representative initiators are UV radiation and chemical initiators, such as azocompounds like azobisisobutyronitrile; and peroxygen compounds such as benzoyl peroxide, t-butylperoctoate, t-butylperbenzoate and isopropylpercarbonate. Other suitable initiators are mentioned in U.S. Pat. Nos. 4,192,921; 4,246,386; and 4,283,499. The free-radical initiators are employed in an effective amount sufficient to induce polymerization of the monomers in a particular monomer mixture. An effective amount will vary, as those skilled in the art can appreciate, and will depend generally on the type of initiators employed, as well as the type and proportion of monomers being polymerized. Generally, an effective amount is from about 0.005 to about 10, and preferably from about 0.025 to about 2 weight percent, based on total monomer weight.

The monomer mixture used to prepare the copolymer is preferably suspension polymerized wherein the monomer mixture is suspended within an agitated suspending medium comprising a liquid that is substantially immiscible with the monomer phase. Due to the fact that most monomers employed herein are primarily non-polar organic compounds, a preferred suspending medium is water. Generally, the suspending medium is employed in an amount from about 30 to about 70 weight percent based on total weight of the monomer mixture and suspending medium. Various suspending agents are conventionally employed to assist with maintaining a relatively uniform suspension of monomer droplets within the suspending medium. Illustrative suspending agents are gelatin, polyvinyl alcohol, magnesium hydroxide, hydroxyethylcellulose, methylcelluloses, and carboxymethylmethylcellulose. The amount of suspending agent used can vary widely depending on the monomers and suspending agents employed.

Figure 4:
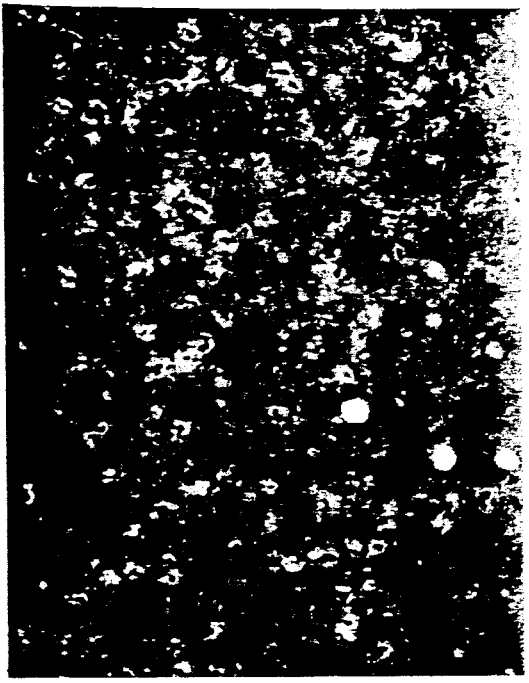
FIGS. 4-6 are SEMs of porous adsorbents that may be obtained by the methods of Examples 3, 4, and 5 respectively, as described hereinafter.
Figure 5:
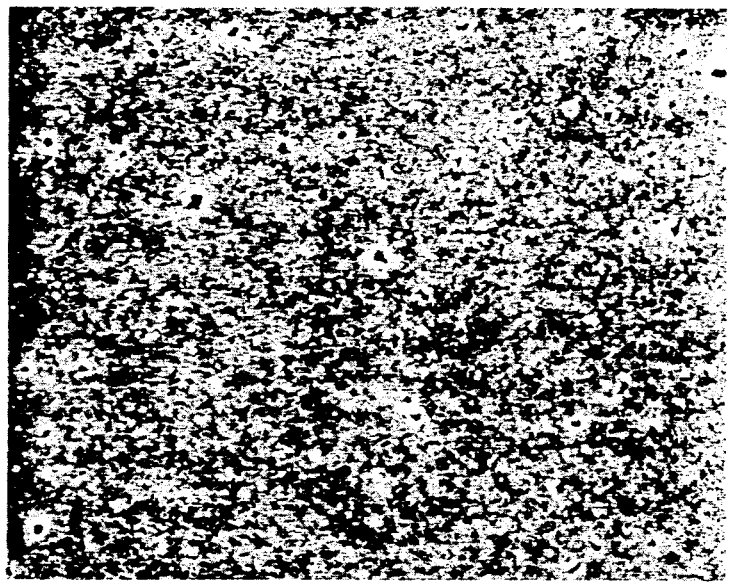
Figure 6:
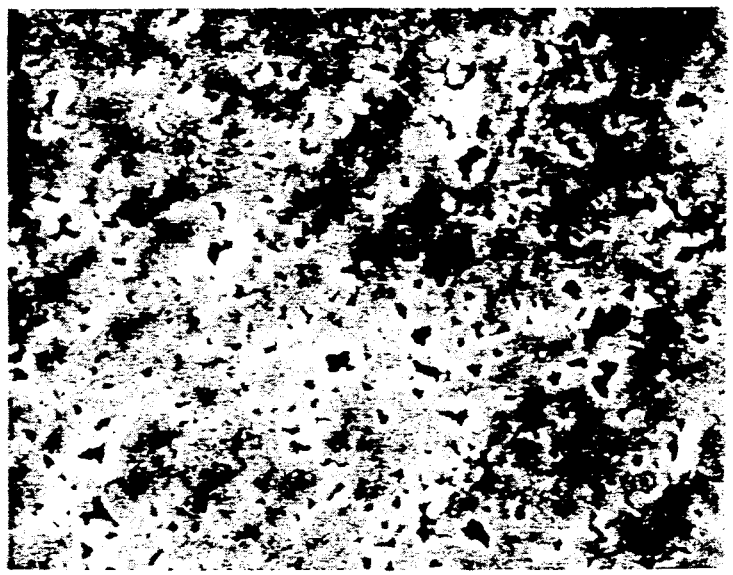

A porous copolymer employed to prepare a preferred adsorbent for practicing the present invention has a novel, cellular polymeric structure. This cellular structure is illustrated by FIG. 1 which is a scanning electron photomicrograph of a cross section from such a porous copolymer. In FIG. 1, the photomicrograph was obtained by reswelling the copolymer in toluene and, finally, in iso-octane. After polymerization, the copolymer was steam distilled to remove iso-octane therein that was used as an inert diluent during polymerization. After distillation, the copolymer was dried and swollen to maximum swellability in an excess amount of toluene. Thereafter, iso-octane was gradually added to the swollen copolymer such that the toluene in the copolymer was exchanged with iso-octane. The copolymer was then dried and the photomicrograph taken thereafter. In FIGS. 4–6, the photomicrographs were taken with the resin in a dry state, but the resins were not reswollen, as described above, after being produced.

In reference to FIG. 1, it is seen that the cellular-type structure comprises a macroporous void phase which is dispersed within a continuous copolymer phase. The void phase is dispersed so as to form a plurality of cellular void spaces which are at least partially enclosed by walls of the continuous copolymer phase. As used herein, the term "a plurality of cellular void spaces which are at least partially enclosed by walls of the continuous copolymer phase" is intended to encompass copolymers wherein individual cellular void spaces may, or may not be, substantially completely enclosed by the continuous copolymer phase. In the event that the copolymer phase substantially completely encloses the cellular void spaces, the spaces would define a discontinuous void phase and essentially be a "closed cell" as that term is used in describing foams. Where the copolymer phase only partially encloses the cellular void spaces, the spaces would be similar in appearance to an "open cell" as that term is used in discussing foam technology. The terms open cell and closed cell are discussed in Ulimann's Encyclopedia of Industrial Chemistry, 5th Ed., Vol. A-11 (VCH Publishers New York, N.Y. 1988) at pages 436–439, the teachings of which are incorporated herein by reference. FIG. 1 is an example of a closed cell structure.

The cellular void spaces within the copolymer are essentially polygonal in shape with a diameter that generally ranges from about 100 to about 2000 Å. When post-crosslinked as described hereinafter, the cellular void spaces may appear less polygonal in shape, and in many instances will appear essentially spherical.

Figure 2:
FIG. 2 is a SEM of a conventional macroporous copolymer.

This cellular structure is substantially different when compared to the structure of a conventional macroporous or macroreticular copolymer. FIG. 2 is another scanning electron photomicrograph which illustrates a cross section from a typical macroporous or macroreticular copolymer. Referring to FIG. 2, macropores are seen as channels, or veins, of continuous void phase that are disposed between a continuous copolymer phase. FIG. 2 illustrates that such conventional macroporous or macroreticular copolymers have a copolymer phase consisting of an agglomerated mass of minute spherical gel copolymer particles, as described in U.S. Pat. No. 4,224,415 previously discussed herein.

The cellular polymeric structure is obtained by using an effective amount of a phase-separating diluent with minor amounts of crosslinking monomer, as described hereinafter. It is also believed that the morphology of the cellular structure is promoted by adjusting the amount of free-radical polymerization initiator and the polymerization temperature.

The amount of phase-separating diluent employed is an important parameter for obtaining a cellular structure. In general, for a given proportion of monovinylidene monomer, crosslinking monomer and initiator, and holding polymerization conditions constant, when the amount of diluent is relatively low the resulting copolymer structure is microporous, i.e., it has pores generally less than about 50 Å in size. As the amount of diluent is increased, it is believed that a transition point is reached wherein phase separation of the copolymer from the monomer/diluent phase occurs and the copolymer structure gradually changes from being essentially all microporous to one having a conventional macroporous or macroreticular structure, as illustrated by FIG. 2. As the amount of diluent is increased beyond this initial transition point, it is believed that a second transition point is reached wherein phase separation gradually results in a cellular polymeric structure, as illustrated by FIG. 1. The cellular copolymers disclosed herein are obtained by using an amount of diluent which is sufficient to reach this second transition point.

The amount of phase-separating diluent necessary to obtain a cellular structure varies with the choice of monomers, the amount of crosslinking monomer, and diluent employed for a given polymerization. As a result, a sufficient amount of diluent must be determined more or less empirically for a given monomerdiluent system. In a preferred styrene-divinylbenzene monomer system employing a $C_{6-10}$ alkane diluent, such as hexane, heptane, or iso-octane, the amount of phase-separating diluent required is desirably from about 30 to about 80 weight percent based on the weight of the monomers and diluent. In this system, the amount of diluent is preferably from about 35 to about 50 weight percent.

Relatively minor amounts of crosslinking monomer assist with formation of a cellular structure. For the preferred styrene-divinylbenzene monomer system employing a $C_{6-10}$ alkane diluent as previously described, the amount of crosslinking monomer is preferably from about 0.3 to about 5 weight percent, and more preferably from about 1 to about 4 weight percent based on total weight of the monomers employed. Notwithstanding the above, it should be understood that such amounts of crosslinking monomer may not be necessary for other monomer/diluent systems.

The amount of free-radical initiator employed can also be used to promote formation of a cellular structure. Generally, for a given proportion of reactants and polymerization conditions, an increase in the amount of initiator employed can increase the size of the cells which are formed. This result is exemplified by comparison of FIGS. 5 and 6, wherein the respective examples differ essentially in the amount of initiator employed.

The polymerization temperature is also a parameter which can be used to promote formation of a cellular structure. The polymerization temperature employed is preferably higher than those typically used in suspension polymerization of ethylenically unsaturated monomers. The temperature is preferably from about 95 to about 140° C., and more preferably from about 100 to about 120° C.

To obtain adsorbent materials employed in the process of the invention, the above-described porous copolymer beads are post-crosslinked in a swollen state in the presence of a Frieder-Crafts catalyst to introduce rigid microporosity (pores with a diameter less than about 50 Å) into the copolymer. Post-crosslinking of the copolymer while it is in a swollen state displaces and rearranges adjacent polymer chains, thereby causing an increase in the number of micropores. This rearrangement serves to increase overall porosity and surface area of the copolymer, while also decreasing the average pore size. Post-crosslinking also serves to impart rigidity to the copolymer structure, which is useful for providing enhanced physical and dimensional stability to the copolymer.

Post-crosslinking may be achieved by swelling the copolymer with a swelling agent and subsequently reacting the copolymer with a polyfunctional alkylating or acylating agent, as is described in U.S. Pat. Nos. 4,191,813 and 4,263,407.

A preferred method for post-crosslinking the copolymer comprises haloalkylating the copolymer with a haloalkylating agent, swelling the resulting haloalkylated copolymer with an inert swelling agent, and thereafter maintaining the swollen, haloalkylated copolymer at a temperature and in the presence of a Friedel-Crafts catalyst such that haloalkyl moieties on the copolymer react with an aromatic ring of an adjacent copolymer chain to form a bridging moiety. It is preferred to remove excess haloalkylating agent and/or solvents employed in haloalkylating the copolymer prior to post-crosslinking so as to obtain high quality copolymers and also adsorbent materials prepared therefrom having high capacity for adsorption of hydrocarbons. Formation of the bridging moieties between individual polymer chains results in increased porosity and strength, as previously mentioned. This type of post-crosslinking method is described in U.S. Pat. No. 4,950,332, the relevant teachings of which are incorporated herein by reference.

In general, haloalkylation is achieved by contacting the copolymer with a haloalkylating agent under conditions sufficient to substitute the copolymer with haloalkyl moieties. Preferably, the copolymer is haloalkylated by first swelling it under non-reactive conditions with the haloalkylating agent and an effective amount of a Friedel-Crafts catalyst. The haloalkylating agent advantageously has the Friedel-Crafts catalyst dissolved therein. The swollen copolymer beads are then maintained at a temperature sufficient to react the haloalkylating agent with the copolymer beads until achieving a desired degree of reaction. In preparing the adsorbent materials herein, the porous copolymer is preferably halomethylated and most preferably chloromethylated. Methods for haloalkylating copolymer particles are known. Illustrative of such are U.S. Pat. Nos. 2,6429417; 299609480; and 2,992,544, the relevant teachings of which are incorporated herein by reference. Chloromethylmethylether is commonly employed as a haloalkylating agent. After haloalkylation, it is preferred to remove excess haloalkylating agent and/or solvents used during haloalkylation, as mentioned above. This can be accomplished by any method, such as washing with an organic solvent.

After haloalkylation, the copolymer is contacted with a swelling agent to expand the copolymer structure. Suitable swelling agents are solvents which are substantially inert during post-crosslinking of the haloalkylated copolymer and include chlorinated hydrocarbons, such as dichloroethane, chlorobenzene, dichlorobenzene, ethylene dichloride, methylene chloride, and propylene dichloride; or nitrogen-substituted aromatics, like nitrobenzene. A preferred swelling agent is dichloroethane. Advantageously, the copolymer is allowed to swell in an excess amount of the swelling agent for at least about 30 minutes. Preferably, the copolymer is contacted with the swelling agent for a time sufficient to substantially attain equilibrium with respect to swelling of the particular swelling agent employed. It is also generally convenient to dissolve the Friedel-Crafts catalyst employed in the subsequent post-crosslinking reaction within the swelling agent.

Once swollen, the haloalkylated copolymer is maintained at a temperature and in the presence of a Frieder-Crafts catalyst such that the bridging moieties are formed by reaction of the haloalkyl moieties with an adjacent aromatic ring. Suitable catalysts are those discussed in connection with haloalkylation. Preferably, the reaction temperature can be from about 20 to about 180° C. for a period of at least about 0.5 hours. More preferably, the temperature is from about 60 to about 85° C. Where the copolymer is chloromethylated, reaction of a chloromethyl group with the aromatic ring of an adjacent copolymer chain results in formation of a methylene bridge, i.e., a $-CH_2-$ moiety, between two copolymer chains. After formation of the bridging moiety, the swelling agent is removed by conventional methods, such as solvent extraction, washing, drying, or a combination thereof. A drying step is most preferred, since it is advantageous to employ an adsorbent in a dry state. If a drying step is used, it is preferred to avoid an oxygen-containing atmosphere at temperatures above normal room temperature.

After post-crosslinking, the resulting adsorbent material desirably has a specific surface area of at least about 600 square meters per gram ("m$^2$/g") of dry adsorbent resin, preferably at least about 1000, more preferably at least about 1200 m$^2$/g. Specific surface area may be determined by well-known BET nitrogen adsorption techniques.

In terms of porosity, the adsorbent material desirably has from about 0.5 to about 1.5 cubic centimeters of pore volume per gram of adsorbent material ("cc/g"). Preferably, the adsorbent has from about 0.7 to about 1.3 cc/g of porosity. Of this porosity, the amount contributed by macropores (pores of about 100 Å or more) is desirably from about 0.025 to about 0.6, and preferably 0.04 to about 0.5 cc/g. It is desirable to have macroporosity of at least about 0.025 cc/g to obtain a copolymer having sufficient mechanical and osmotic strength to minimize bead breakage during post-crosslinking of the copolymer. If macroporosity is substantially greater than 0.6 cc/g. then the resulting adsorbent may have insufficient capacity for adsorption of fuel vapors.

The adsorbent material may be used in any desirable form that is capable of adsorbing fuel vapors when employed in the particular fuel vapor recovery system of interest. Generally, an advantageous form comprises granular particles of the adsorbent material, preferably in the form of substantially spherical beads. If used in the form of granular particles or spherical beads, the beads or particles may generally have a diameter of from about 50 to about 5000 μm. The actual size employed in practicing the invention will, of course, ultimately depend upon the particular fuel vapor recovery system into which the beads are to be placed, as those skilled in the art can appreciate. Where the beads are to be packed within canisters typically employed for activated carbon adsorbents as previously discussed, the geometry of the canister and pressure drop which can be tolerated through the beads will be important to consider when selecting a suitable bead size. For such canister applications, bead diameters of from about 500 to 3000 μm will usually be adequate, with 1000 to 2000 μm being preferred.

The adsorbent material is used in an amount sufficient to recover at least a portion of the fuel vapors emitted from a fuel reservoir. Desirably, at least about 10 weight percent of the vapors are recovered by the adsorbent materials preferably at least about 60 weight percent, and more preferably at least about 90 weight percent.

As used herein, the term "fuel reservoir" is meant to include any apparatus associated with the holding or storage of fuels. In a preferred embodiment, the fuel reservoir may be any apparatus employed to store and convey fuel to the engine of a motor vehicle prior to combustion. Examples of fuel reservoirs in a motor vehicle include a fuel storage tank, fuel distribution lines, and carburetor bowl as described in U.S. Pat. Nos. 3,093,124; 391919587; 3,352,294; and 3,844,739, previously discussed herein, as well as equipment associated with modern fuel injection systems widely employed in today's vehicles. Other fuel reservoirs of interest include bulk storage tanks and storage tanks associated with transport barges or oceangoing tanker vessels. For these other types of fuel reservoirs, the adsorbents disclosed herein could be used in conjunction with commercially available equipment to recover the fuel vapors through well-known pressure or temperature swing adsorption methods.

The fuel vapors of particular interest herein include volatile hydrocarbon components of gasoline, diesel fuel, or crude oil. Such volatile components are composed primarily of $C_{3-6}$ alkanes, such as propane, butane, pentane, and isobutane.

The adsorbent material has a relatively high capacity for recovery of hydrocarbon fuel vapors. Recognized tests and parameters to evaluate hydrocarbon adsorption characteristics are described in the examples that follow.

One parameter used is butane working capacity, which is defined in the following examples. Adsorbents employed in practicing this invention desirably have a butane working capacity ("BWC") of at least about 10 grams butane per 100 cubic centimeters of adsorbent ("g/100cc"). Preferably, the adsorbent material has a BWC of at least about 12, more preferably at least about 14 g/100cc. In contrast, the activated carbon adsorbents conventionally employed by motor vehicle manufacturers have a BWC of only about 9 to 10 g/100cc. Other parameters that may be used to describe performance are weight working capacity ("WWC") and butane adsorption capacity ("BAC"), also described in the examples. The adsorbents disclosed herein desirably have a WWC of at least about 30, preferably at least about 35, and more preferably at least about 40 grams per 100 grams of adsorbent ("g/100g"). In terms of BAC, the adsorbents desirably exhibit a capacity figure of at least about 30, preferably at least about 40, and more preferably at least about 45 grams per 100 grams of adsorbent ("g/100g").

The relative high capacity of the adsorbent materials disclosed herein allows for use of essentially the same or smaller amount of adsorbent material, and in many instances it also provides significantly better adsorption capacity relative to activated carbon. As a result, manufacturers can meet increasingly more restrictive governmental fuel emission regulations, without having to greatly increase the weight of adsorbent used, or increase adsorbent space allotments with the associated re-tooling expense.

Specific Embodiments of the Invention

The following examples are intended to illustrate the invention and should not be construed to limit the scope of the appended claims. All parts and percentages are by weight and all temperatures are in degrees Celsius (°C.), unless otherwise indicated.

EXAMPLES 1-10

Examples 1-10 concern use of adsorbents prepared from copolymers having a cellular polymeric structure for reducing hydrocarbon fuel vapor emissions.

Adsorbent Preparation

A suitable polymerization kettle equipped with agitation is charged with a monomer phase composed of measured amounts of styrene, a divinylbenzene mixture obtained from The Dow Chemical Company containing 55 weight percent divinylbenzene and 45 weight percent ethylvinylbenzene based on weight of the mixture, commercial grade iso-octane, and t-butylperbenzoate (t-BPB) and t-butylperoctoate (t-BPO) as free-radical initiators. The proportion of each component, in terms of a weight percentage, employed in a particular example is listed in Table I. After charging the kettle with the monomer phase, an aqueous phase composed of water, sodium dichromate, and carboxymethylmethylcellulose (CMMC) is added. The proportion of monomer phase to aqueous phase employed is 1:1. The proportion of specific aqueous phase components, also in terms of a weight percentage, are listed in Table I.

TABLE I

MATERIALS AND CONDITIONS EMPLOYED TO MAKE ADSORBENTS IN EXAMPLES 1-12

| Example No. | Styrene (%)[1] | DVB (%)[1] | Diluent (%)[2] | t-BPO (%)[3] | t-BPB (%)[3] | Sodium Dichromate (%)[4] | CMMC (%)[4] | Initial Temp (°C.) | Initial Time (hrs) | Finish Temp (°C.) | Finish Time (hrs) |
|---|---|---|---|---|---|---|---|---|---|---|---|
| 1 | 99.25 | 0.75 | 42 | 0 | 0.2 | 0.17 | 0.2 | 100 | 18 | 110 | 2 |
| 2 | 98.5 | 1.5 | 35 | 0.1 | 0.2 | 0.17 | 0.2 | 110 | 9 | — | — |
| 3 | 98.5 | 1.5 | 35 | 0.5 | 0.2 | 0.17 | 0.2 | 110 | 9 | — | — |
| 4 | 98.5 | 1.5 | 40 | 0.1 | 0.2 | 0.17 | 0.2 | 110 | 9 | — | — |
| 5 | 98.5 | 1.5 | 40 | 0.5 | 0.2 | 0.17 | 0.2 | 110 | 9 | — | — |
| 6 | 98.5 | 1.5 | 45 | 0.025 | 0.2 | 0.17 | 0.2 | 110 | 9 | — | — |

TABLE I-continued

MATERIALS AND CONDITIONS EMPLOYED TO MAKE ADSORBENTS IN EXAMPLES 1-12

| Example No. | Styrene (%)[1] | DVB (%)[1] | Diluent (%)[2] | t-BPO (%)[3] | t-BPB (%)[3] | Sodium Dichromate (%)[4] | CMMC (%)[4] | Initial Temp (°C.) | Initial Time (hrs) | Finish Temp (°C.) | Finish Time (hrs) |
|---|---|---|---|---|---|---|---|---|---|---|---|
| 7 | 98.5 | 1.5 | 45 | 0.1 | 0.2 | 0.17 | 0.2 | 110 | 9 | — | — |
| 8 | 98.5 | 1.5 | 45 | 0.15 | 0.2 | 0.17 | 0.2 | 80 | 10 | 110 | 5 |
| 9 | 98.5 | 1.5 | 50 | 0.5 | 0.2 | 0.17 | 0.2 | 110 | 9 | — | — |
| 10 | 98 | 2 | 45 | 0.05 | 0.2 | 0.17 | 0.2 | 110 | 9 | — | — |
| 11 | 96 | 4 | 42 | 0.05 | 0.2 | 0.17 | 0.2 | 110 | 9 | — | — |
| 12 | 95 | 5 | 42 | 0.05 | 0.2 | 0.17 | 0.2 | 110 | 9 | — | — |

[1] % DVB or styrene = $\dfrac{\text{weight styrene or divinylbenzene}}{\text{total monomer weight}}$

[2] % Diluent = $\dfrac{\text{weight diluent}}{\text{total weight of monomers + diluent}}$

[3] t-BPB or t-BPO = $\dfrac{\text{weight of initiator}}{\text{total monomer weight}}$

[4] % Sodium Dichromate or CMMC = $\dfrac{\text{weight of component}}{\text{total weight of aqueous phase}}$ After adding the monomer and aqueous phases, the kettle is sealed and purged with nitrogen. Agitation is initiated to size the monomer phase into droplets. The kettle contents are heated to an initial polymerization temperature (Initial Temperature) as indicated in Table I and, subsequently, maintained at this temperature for a time (Initial Time) also indicated in Table I to obtain porous copolymer beads. In two of the examples, the respective polymerizations are concluded by increasing the temperature to a temperature (Finish Temperature) and for a time (Finish Time) as indicated in Table I to more fully complete the polymerization. The kettle contents are then allowed to cool to room temperature. The porous copolymer beads are recovered from the kettle, washed with water, and the iso-octane diluent is removed by steam distillation. The beads are finally allowed to dry at room temperature.

The porous copolymer beads are then post-crosslinked by substituting the copolymer with chloromethyl groups, washing the beads to remove excess haloalkylating agent, swelling the chloromethylated copolymer beads with an inert swelling agents and then reacting the chloromethyl groups in the presence of a Friedr-Crafts catalyst. For each examples a 30 gram portion of the respective beads and 500 milliliters (ml) of chloromethylmethylether (CMME) are placed in a 1 liter reactor. The copolymer beads are allowed to swell with the CMME under moderate agitation for 30 minutes. Thereafter, 9 grams of ferric chloride is added to the reactor. The reactor contents are then maintained at a temperature of 45° C. for about 2.5 hours. The reactor contents are cooled and washed with an excess amount of methanol to remove the CMME from the beads. Excess liquid is removed from the reactor and the chloromethylated beads are again washed with methanol and finally recovered from the reactor.

The resulting methanol-moist chloromethylated beads are swollen with an excess amount of 1,2-dichloroethane (EDC) in a 1 liter reactor. Thereafter, the reactor contents are heated to distill off any residual amount of methanol from the beads. Upon reaching an overhead product temperature of 82° C., distillation is discontinued and the beads are allowed to cool to about 20° C. A 9 gram amount of ferric chloride catalyst is added to the reactor and the cooled beads are allowed to contact the catalyst for about 30 minutes. The beads are then heated and maintained at a temperature of 80° C. for 3 hours. After cooling the resulting adsorbent beads to room temperature, the EDC is extracted by rinsing the beads five times with methanol. The adsorbent beads are dried overnight in a vacuum oven at 120° C.

After drying, the beads are analyzed to determine the various physical properties listed in Table II. The presence of a cellular polymeric structure is confirmed by scanning electron microscopy. FIGS. 4, 5, and 6 illustrate the structures obtainable by the methods of Examples 3, 4, and 5 respectively. The figures illustrate a structure wherein a discontinuous porous void phase is dispersed within a continuous copolymer phase, as previously described herein.

Evaluation of Adsorbents for Hydrocarbon Adsorption

For each example, the respective adsorbent beads are evaluated by the following method to determine a capacity for adsorbing hydrocarbon vapor. The hydrocarbon employed is butane, which is a major component of fuel vapors emitted from gasoline.

Figure 3:
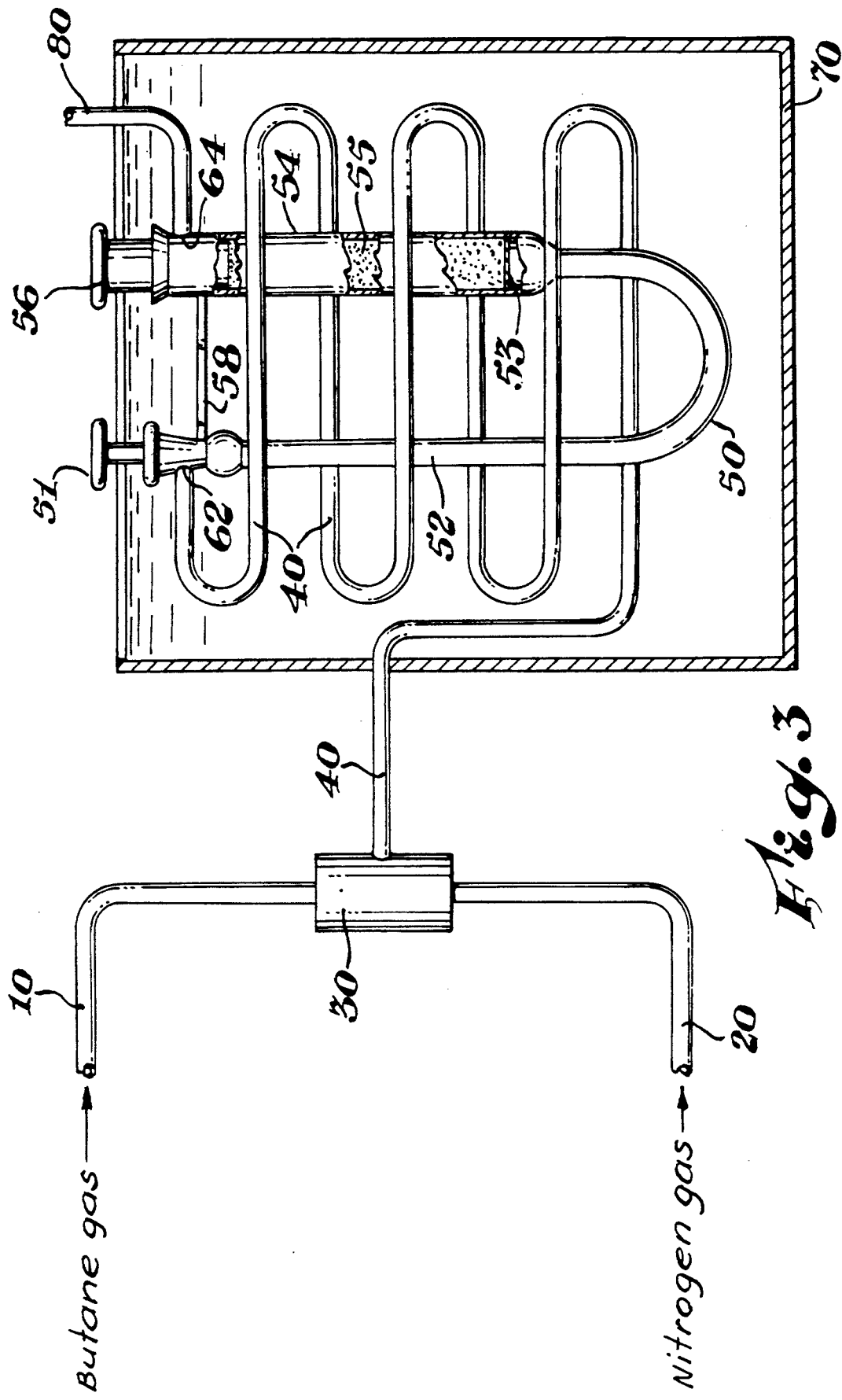
FIG. 3 is a schematic illustration of apparatus employed to determine the hydrocarbon adsorption characteristics of the adsorbents described herein.

The method employs the apparatus depicted in FIG. 3. Dry butane gas is introduced into the apparatus through tube 10. The butane flow rate is adjusted by a control valve and flow meter, both of which are not shown. Dry nitrogen gas is introduced to the apparatus through tube 20. The flow of nitrogen gas is similarly controlled by a control valve and flow meter, also not shown. A two-way stopcock 30 allows for the introduction of either butane gas or nitrogen gas (the choice depending upon whether fuel is being adsorbed or desorbed as discussed hereinafter) through tube 40 to an adsorption tube which is generally referred to as 50 in FIG. 3.

The adsorption tube 50 is fabricated from glassware parts available from the Kontes Company. The adsorption tube is essentially a "U"-shaped glass tube which is fitted on one end with a right angle stopcock 51 and at the other end with another right angle stopcock 56. The stopcock 51 is a 14/20 size, hollow, medium length glass stopcock (Kontes Catalog No. K-89100) with a serrated hose connector (not shown) located at tube attachment point 62. The right angle stopcock 56 is a size 4. 10 millimeter ("mm") O.D. stem glass stopcock (Kontes Catalog No. K-84700) with an attached size B serrated hose connector (Kontes Catalog No. K-89340-not shown) located at tube attachment point 64. The portion 52 of the adsorption tube is fabricated from a 10 mm O.D. by 1.0 mm thick piece of standard glass wall tubing. The portion 54 of the adsorption tube is fabricated from a 20 mm O.D. by 1.2 mm thick piece of standard glass wall tubing. The adsorption tube has a fritted glass disc 53 which is capable of supporting an adsorbent sample 55. The adsorption tube also has a glass support brace 58 which connects and supports the ends of the adsorption tube.

The adsorption tube 50 is placed during the evaluation into a water bath 70 which maintains the tube at a temperature of 25° C.±0.2° C. Nitrogen or butane gas exits the apparatus through vent line 80. A 1 meter length of Tube 40 is placed in the water bath, as generally shown in FIG. 3. Nitrogen or butane gas enters the adsorption tube 50 at attachment point 62 and exits through vent tube 80 at attachment point 64.

Initially, the adsorption tube 50 is dried in a dessicator overnight and weighed to the nearest 0.01 gram to determine a tare weight ($W_t$) for the tube. A portion of a given adsorbent, after drying overnight at 110° C., is then placed within the adsorption tube in an amount sufficient to yield a height of adsorbent in the tube of from between 8.5 and 10.0 centimeters (cm) above the fritted disc 53. The sample and adsorption tube are then weighed to the nearest 0.01 gram to obtain a combined weight $W_1$. The weight of the sample is the difference between $W_1$ and $W_t$.

The adsorption tube 50 filled with adsorbent sample 55 is thereafter placed into the water bath 70 and allowed to equilibrate to the water temperature over a period of approximately 10 minutes. Butane gas is then introduced into the adsorption tube through tube 40 such that the gas flow is upflow through the adsorbent sample 55. The butane gas flow is maintained at 100 cm³/min for 1 hour. Thereafter, the adsorbent tube is removed from the water bath, dried to remove water on the exterior surfaces of the tube, and re-weighed to the nearest 0.01 gram to obtain a weight $W_2$. The adsorption tube is returned to the water bath, allowed to equilibrate with the water temperature, and the two-way stopcock is adjusted such that dry nitrogen gas flows upwardly through the sample to purge adsorbed butane from the sample. The flow of nitrogen gas is maintained at 100 cm³/min for 1 hour. Thereafter, the adsorption tube is removed from the water bath, dried to remove water from external surfaces of the tube, and re-weighed to the nearest 0.01 gram to obtain a weight $W_3$.

The data obtained by use of the above-described procedure is used to calculate a weight working capacity (WWC), a butane working capacity (BWC), and a butane adsorption capacity (BAC). WWC, BWC and BAC are calculated as follows:

$$BAC = (W_2 - W_1)/(W_1 - W_t) * 100$$

$$WWC = (W_2 - W_3)/(W_1 - W_t) * 100$$

$$BWC = (WWC)(\rho_{app})$$

wherein:
$W_t$ = tare weight of tube;
$W_1$ = weight of tube plus adsorbent sample;
$W_2$ = weight of tube, adsorbent sample, and adsorbed butane;
$W_3$ = weight of tube, adsorbent sample, and adsorbed butane left after purging with nitrogen gas;
$\rho_{app}$ = the apparent density of the adsorbent in (g/cc);
BAC = butane adsorption capacity expressed as grams butane adsorbed per 100 grams adsorbent (g/100g);
WWC = butane weight working capacity expressed as grams butane desorbed per grams of adsorbent (g/100g); and
BWC = butane working capacity expressed as grams butane desorbed per 100 cubic centimeters of adsorbent (g/100cc).

The BWC, BAC and WWC values obtainable by performing the above-described butane adsorption analysis for each Example appear in Table II, along with other physical property data.

TABLE II

| Example No. | Vol. Avg. Diameter of Adsorbent (μm) | Crush Strength (g/bead) | Whole Beads (%) | Specific Surface Area (m²/g) | Total Porosity (cc/g) | Porosity >100 Å (cc/g) | BWC (g/100 cc) | BAC (g/100 g) | WWC (g/100 g) |
|---|---|---|---|---|---|---|---|---|---|
| 1 | 799 | 240 | 99 | 1150 | 1.207 | 0.400 | 14.9 | 49.5 | 46.7 |
| 2 | 840 | 612 | 99 | 1278 | 0.934 | 0.074 | 16.5 | 42.9 | 37.4 |
| 3 | 670 | 670 | 99 | 1310 | 1.174 | 0.050 | 15.8 | 43.2 | 38.3 |
| 4 | 670 | 456 | 98 | 1376 | 1.059 | 0.040 | 20.2 | 50.3 | 45.1 |
| 5 | 666 | 666 | 97 | 1220 | 1.102 | 0.055 | 14.4 | 40.1 | 35.5 |
| 6 | 662 | 485 | 99 | 1409 | 1.255 | 0.139 | 14.5 | 43.2 | 37.8 |
| 7 | 1521 | 1147 | 96 | 1250 | 1.025 | 0.092 | 16.1 | 42.4 | 37.7 |
| 8 | 780 | 1464 | 100 | 1158 | 0.961 | 0.223 | 13.5 | 39.0 | 34.8 |
| 9 | 584 | 666 | 99 | 895 | 0.730 | 0.225 | 13.4 | 39.8 | 36.8 |
| 10 | 808 | 1110 | 95 | 986 | 0.901 | 0.254 | 13.4 | 43.1 | 38.8 |
| 11 | 783 | 1828 | 99 | 1500 | 1.218 | 0.336 | 15.3 | 49.5 | 41.2 |
| 12 | 802 | 1594 | 100 | 1365 | 1.305 | 0.391 | 12.8 | 42.6 | 34.5 |
| A | * | * | * | * | * | * | 8.2 | 45.0 | 27.0 |

*Not determined or applicable.

Crush Strength is determined by taking a representative sample of at least about 20 beads from a given sample of adsorbent or copolymer beads, and determining the force, in grams, needed to fracture each bead using a Chatillon Scale, Model DPP-1KG, available from J. Chatillon & Sons Company. Crush strength is reported as the average of the force measurements obtained for the 20 beads.

Volume average particle diameters are determined by use of a particle size analyzer obtained from the HIAC-Royco Company.

The number of whole beads, expressed as a percent, is determined by microscopic examination of a representative sample of at least about 200 beads. The number of substantially spherical beads in the sample is determined and a percentage is calculated therefrom.

Porosity and specific surface area data are determined by well-known BET nitrogen adsorption techniques.

EXAMPLES 11–12

The procedure of Examples 1–10 is substantially repeated, except that the adsorbents used are macroporous and do not have a cellular polymeric structure. The proportions of specific materials, polymerization temperature, physical property data, and evaluation results are also specified in Tables I and II.

COMPARATIVE EXAMPLE A

The butane working capacity analysis described in Examples 1–12 is substantially repeated, except that activated carbon is employed as the adsorbent material. The activated carbon is granular in form with particle sizes ranging from 12 to 35 U.S. Standard Mesh size and is commercially available from Westvaco Company as WVA-900. The activated carbon has an apparent density of 0.305 g/cc. When evaluated for butane adsorption as in Examples 1–10, the activated carbon has a BWC of 8.2 g/100cc, a BAC of 45.0 g/100g, and a WWC of 27 percent.

The data show that the polymeric adsorbents disclosed herein have relatively high capacities for hydrocarbon adsorption, particularly with respect to working capacities, relative to activated carbon as seen by comparing capacity values in Table II.

What is claimed is:

1. A method for reducing hydrocarbon fuel vapor emissions from fuel reservoirs which comprises:
   contacting a vented hydrocarbon fuel vapor stream from a fuel reservoir with a polymeric adsorbent to retain at least a portion of the hydrocarbon fuel vapors emitted from reservoir, the polymeric adsorbent comprising a macroporous or macroreticular copolymer of at least one monovinylidene aromatic monomer and a crosslinking monomer which has been post-crosslinked in a swollen state in the presence of a Friedel-Crafts catalyst.

2. The method of claim 1 wherein the at least one monovinylidene aromatic monomer is selected from styrene, vinylbenzyl chloride, vinyltoluene, ethylstyrene, or t-butylstyrene.

3. The method of claim 1 wherein the crosslinking monomer is selected from divinylbenzene, trivinylbenzene, or ethylene glycol dimethacrylate.

4. The method of claim 1 wherein the macroporous or macroreticular copolymer comprises from about 99.25 to about 95 weight percent of the at least one monovinylidene aromatic monomer and from about 0.75 to about 5 weight percent of the crosslinking monomer, based on monomer weight.

5. The method of claim 1 wherein the macroporous or macroreticular copolymer further comprises less than about 30 weight percent of a non-aromatic monovinylidene monomer based on monomer weight.

6. The method of claim 5 wherein the nonaromatic monovinylidene monomer is methyl methacrylate, methyl acrylate, or methyl ethyl acrylate.

7. The method of claim 1 wherein the macroporous or macroreticular copolymer is post-crosslinked by steps which comprise:
   contacting the macroporous or macroreticular copolymer with a haloalkylating agent under conditions sufficient to substitute the copolymer with haloalkyl moieties;
   removing any excess haloalkylating agent from the copolymer;
   swelling the copolymer with a swelling agent;
   maintaining the swollen copolymer at a temperature and in the presence of a Friedel-Crafts catalyst such that individual haloalkyl moieties on a copolymer chain react with an aromatic ring of an adjacent copolymer chain to form a bridging moiety; and
   removing the swelling agent from the copolymer.

8. The method of claim 7 wherein the haloalkyl moieties are chloromethyl groups.

9. The method of claim 7 wherein the bridging moiety is a —$CH_2$— moiety.

10. The method of claim 7 wherein the swelling solvent is dichloroethane.

11. The method of claim 1 wherein the polymeric adsorbent has a total porosity of from about 0.5 to about 1.5 cc/g.

12. The method of claim 11 wherein from about 0.04 to about 0.5 cc/g of the total porosity is composed of macropores having a diameter of at least about 100 Å.

13. The method of claim 1 wherein the polymeric adsorbent has a specific surface area of at least about 1200 $m^2/g$.

14. The method of claim 1 wherein the polymeric adsorbent has a butane working capacity of at least about 14 g/100 cc.

15. A method for reducing hydrocarbon fuel vapor emissions from fuel reservoirs which comprises:
   contacting a vented hydrocarbon fuel vapor stream from a fuel reservoir with a polymeric adsorbent to retain at least a portion of the hydrocarbon fuel vapors emitted from the fuel reservoir, the adsorbent comprising a macroporous or macroreticular copolymer of at least one monovinylidene aromatic monomer and a crosslinking monomer which is post-crosslinked in a swollen state in the presence of a Friedel-Crafts catalyst, the macroporous or macroreticular copolymer comprising a cellular polymeric structure wherein a macroporous void phase is dispersed within a continuous copolymer phase, the void phase comprising a plurality of cellular void spaces which are at least partially enclosed by walls of the continuous copolymer phase.

16. The method of claim 15 wherein the macroporous or macroreticular copolymer comprises from about 1 to about 4 weight percent crosslinking monomer based on monomer weight.

17. The method of claim 15 wherein the cellular void spaces have diameters of from about 100 to about 2000 Å.

18. The method of claim 15 wherein the at least one monovinylidene aromatic monomer is selected from styrene, vinylbenzyl chloride, vinyltoluene, ethylstyrene, or t-butylstyrene.

19. The method of claim 15 wherein the crosslinking monomer is selected from divinylbenzene, trivinylbenzene, or ethylene glycol dimethacrylate.

20. The method of claim 15 wherein the at least one monovinylidene aromatic monomer is styrene and the crosslinking monomer is divinylbenzene.

21. The method of claim 15 wherein the macroporous or macroreticular copolymer further comprises less than about 30 weight percent of a non-aromatic monovinylidene monomer based on total monomer weight.

22. The method of claim 21 wherein the nonaromatic monovinylidene monomer is selected from methyl methacrylate, methyl acrylate, or methyl ethyl acrylate.

23. The method of claim 15 wherein the macroporous or macroreticular copolymer is post-crosslinked by steps which comprise:

contacting the macroporous or macroreticular copolymer with a haloalkylating agent under conditions sufficient to substitute the copolymer with haloalkyl moieties;

removing any excess haloalkylating agent from the copolymer;

swelling the copolymer with a swelling agent;

maintaining the swollen copolymer at a temperature and in the presence of a Friedel-Crafts catalyst such that individual haloalkyl moieties on a copolymer chain react with an aromatic ring of an adjacent copolymer chain to form a bridging moiety; and thereafter removing the swelling agent from the copolymer.

24. The method of claim 23 wherein the haloalkyl moieties are chloromethyl groups.

25. The method of claim 23 wherein the bridging moiety is a $-CH_2-$ moiety.

26. The method of claim 23 wherein the swelling solvent is dichloroethane.

27. The method of claim 15 wherein the polymeric adsorbent has a total porosity of from about 0.5 to about 1.5 cc/g.

28. The method of claim 27 wherein from about 0.04 to about 0.5 cc/g of the total porosity is composed of macropores having a diameter of at least about 100 Å.

29. The method of claim 15 wherein the polymeric adsorbent has a specific surface area of at least about 1200 m²/g.

30. The method of claim 15 wherein the polymeric adsorbent has a butane working capacity of at least about 14 g/100 cc.

* * * * *